March 12, 1940.  J. T. L. ALLEN  2,193,217
PERISCOPIC REAR VIEW DEVICE
Filed Dec. 16, 1937   3 Sheets-Sheet 1
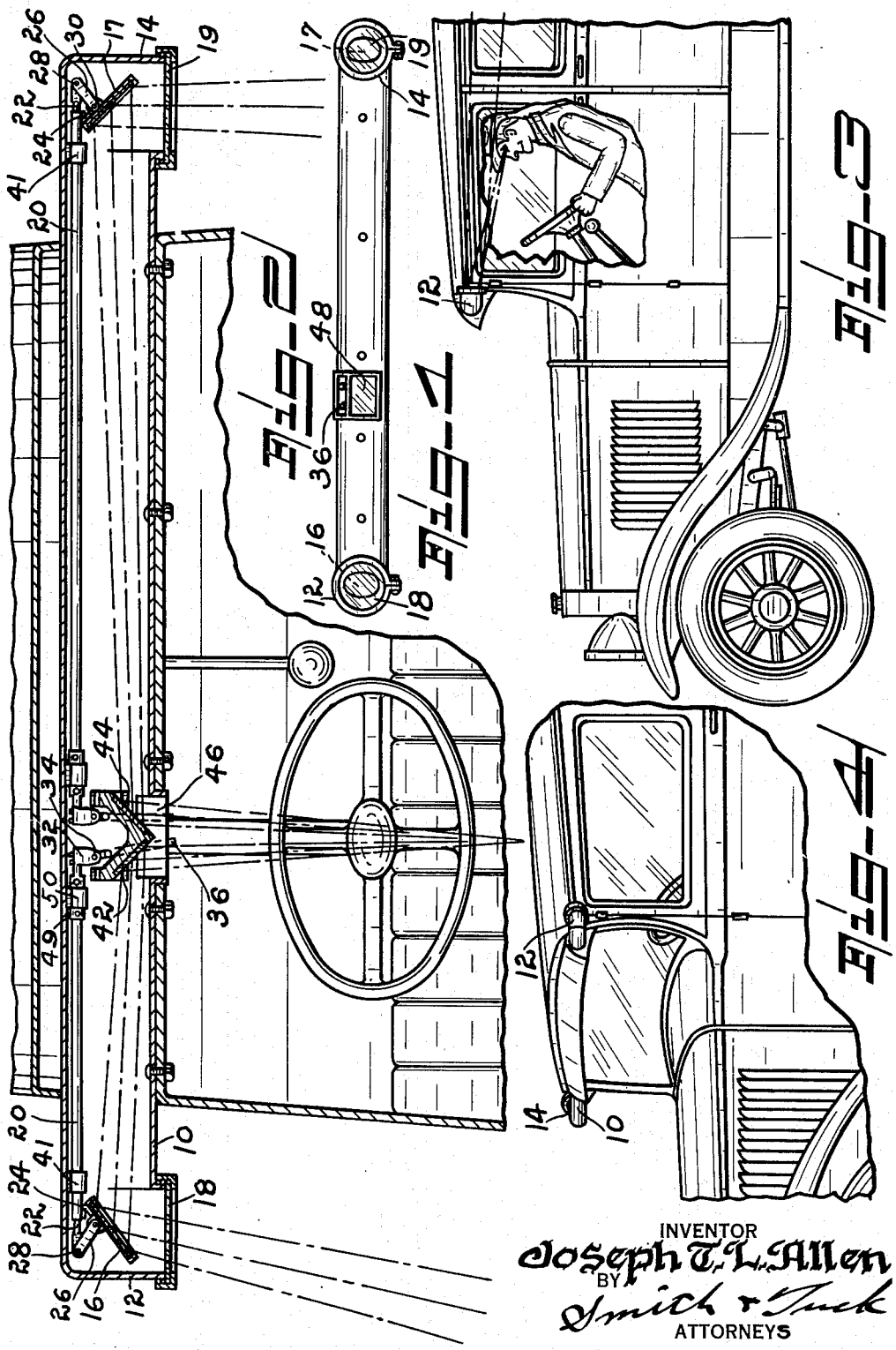
INVENTOR
Joseph T. L. Allen
BY
Smith & Tuck
ATTORNEYS March 12, 1940. J. T. L. ALLEN 2,193,217
PERISCOPIC REAR VIEW DEVICE
Filed Dec. 16, 1937 3 Sheets-Sheet 2
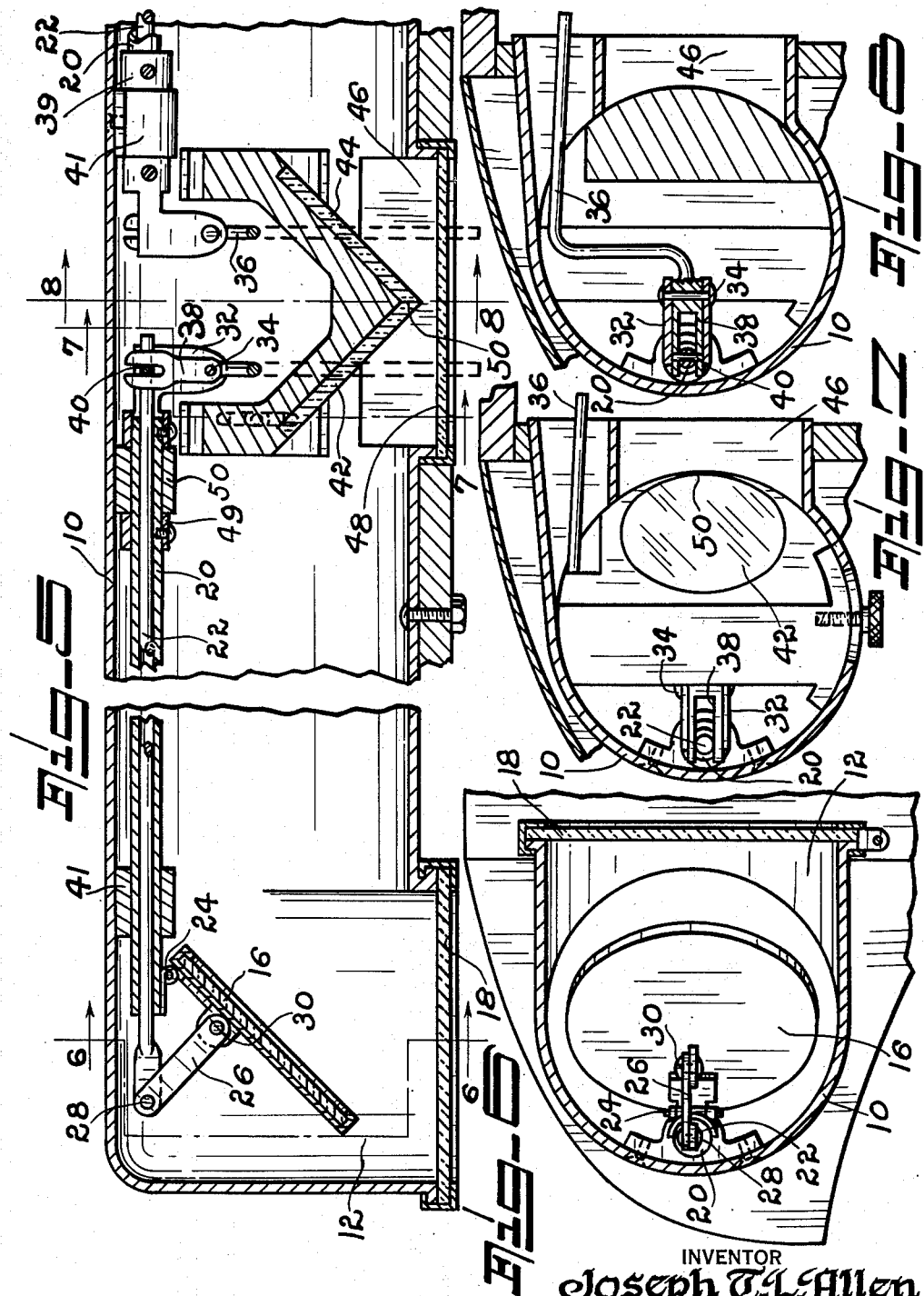
INVENTOR
Joseph T. L. Allen
BY
Smith & Tuck
ATTORNEYS March 12, 1940. J. T. L. ALLEN 2,193,217
PERISCOPIC REAR VIEW DEVICE
Filed Dec. 16, 1937 3 Sheets-Sheet 3
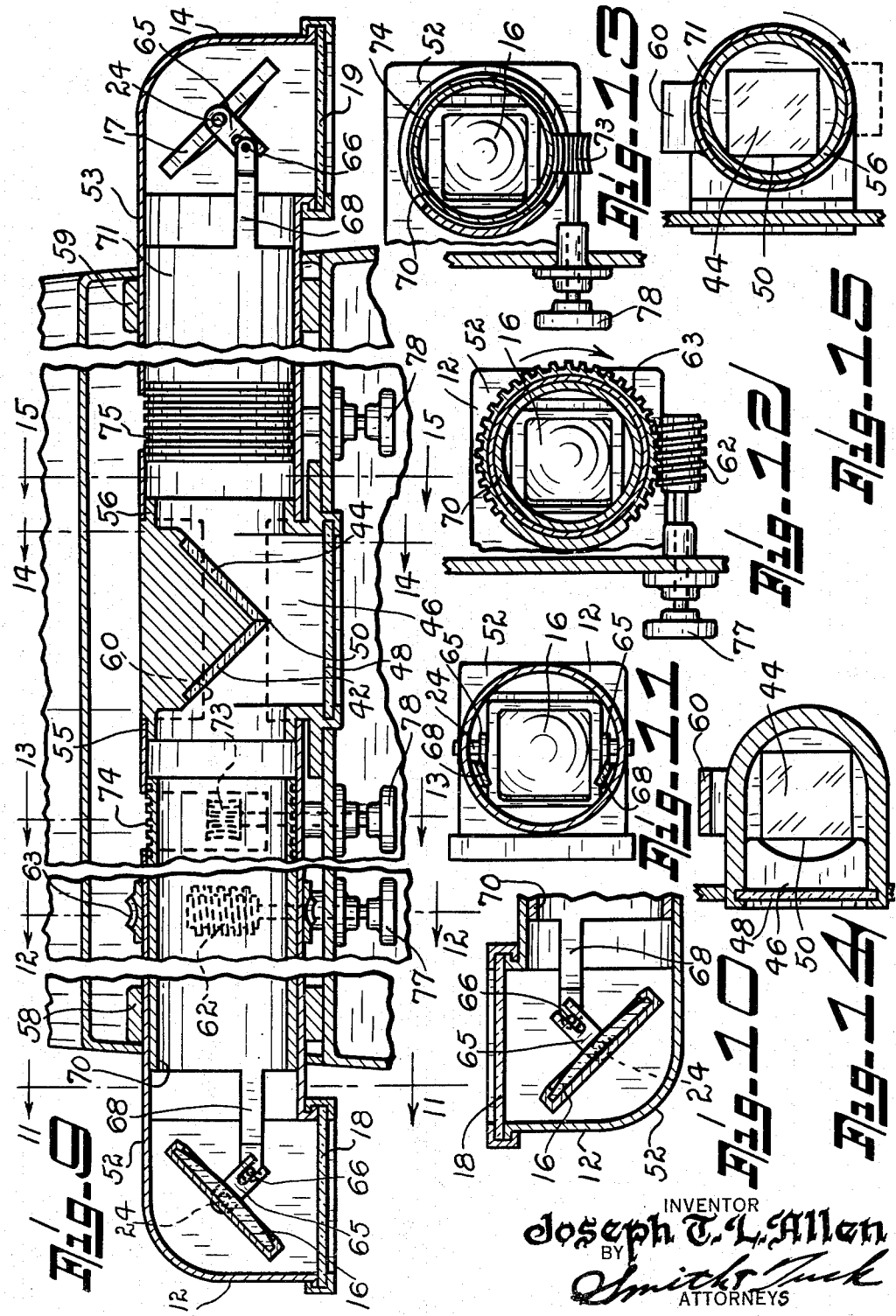

Patented Mar. 12, 1940

2,193,217

UNITED STATES PATENT OFFICE 2,193,217

PERISCOPIC REAR VIEW DEVICE

Joseph T. L. Allen, Oakland, Calif.

Application December 16, 1937, Serial No. 180,239

2 Claims. (Cl. 88—70)

My present invention relates most particularly to a periscopic rear view device.

There are many uses for a rear view device which will combine the advantages of the usual periscope and a rear view mirror. Throughout my following specification I have illustrated and described my invention as it would be constructed for use on a motor vehicle. I wish it to be distinctly understood, however, that there are many other fields requiring such an item. For instance, the operators of motor boats, particularly the smaller, high speed craft, are quite often enclosed without adequate rear view vision. Further, an airplane as now constructed normally limits the view of the pilot, several angles are obstructed and many serious accidents have resulted from the pilot not being able to see the ground in certain directions. Motor trucks, however, open up an unusually attractive field for such a device as I have constructed inasmuch as the truck bodies are quite wide and no windows can be used, due to the truck loading. Further the introduction of traffic lanes on our principal highways call for a different construction of a rear view system.

The principal object of my present invention is, therefore, to provide a rear view arrangement that makes it possible to observe both sides of a vehicle.

Another important object of my invention is to have a periscopic rear view arrangement such that the images obtained by oppositely disposed mirrors arranged one on each side of the vehicle can, by adjustment, be made so that their fields will overlap, or join, in the rear of the vehicle giving the driver a complete view of the road to his rear.

A further object of my present invention is to provide each objective mirror with vertical and lateral adjustment means so that they can be properly adjusted to indicate passing vehicles on either side of the driven vehicle.

A still further object of my present invention is to provide means whereby the view from two oppositely disposed reflecting surfaces can be brought to a common ground glass plate.

Another object is to provide means whereby a driver may have vision forwardly past a vehicle that otherwise hides the view to the front.

Other and more specific objects will be apparent from the following description taken in connection with the accompanying drawings, wherein Figure 1 shows my device in front elevation as it would be used by an operator.

Figure 2 is a horizontal, sectional view through my device showing it as applied to a motor car.

Figures 3 and 4 are fragmentary views showing the method of applying my device to a motor car.

Figure 5 is a fragmentary, horizontal view, in section, showing the principal working parts of my device.

Figures 6, 7, and 8 are cross-sectional views taken along the lines 6—6, 7—7, 8—8 respectively of Figure 5.

Figure 9 is a horizontal, sectional view with certain parts broken away so as to increase the scale of the drawings and showing a modified form of my device which is adaptable for both front or rear view.

Figure 10 is a fragmentary view taken in a horizontal plane of the extreme left end of Figure 9 showing the same as it would appear when viewed looking to the front.

Figures 11, 12, 13, 14, and 15, are cross-sectional views taken along similarly numbered lines of Figure 9.

Referring to the drawings, throughout which like reference characters indicate like parts, 10 designates the main body of my device. This is tubular with an elbow arrangement at 12 and 14. Each of the elbows 12 and 14 house a reflecting mirror as 16 and 17 respectively, having either flat or curved surfaces according to the exact intended use.

Arranged to protect mirrors 16 and 17 are the glass windows 18 and 19, respectively. For each of the objective mirrors I provide a tubular support 20 adapted for partial rotation upon its longitudinal axis and disposed within tube 20 a rod 22 adapted to longitudinal movement. As probably best illustrated in Figures 5 and 6, the mirrors are hingedly secured at 24 to tube 20 and are connected to rod 22 by means of the connecting link 26 which is pivoted to rod 22 at 28 and to the mirror at 30. With this arrangement it is believed it will be clear that the mirrors are subject to rotation around the axis of tube 20 and subject to partial rotation about pivot 24 under control of rod 22. Normally the center of movement of the mirror forms an angle of 45 degrees with the axis of tube 10 and a reasonable adjustment of approximately 10 degrees is provided on each side of that position.

Fixedly secured to the inner end of tubes 20 are the lever pivot members 32. These are arranged to provide pivots at 34 for the control lever 36. The control lever in turn terminates in a bifurcated fork 38 which is adapted to engage an outstanding pin 40 which is fixedly secured within rod 22. Levers 36 extend outwardly normally, as shown, in a rearward direction, so as to be within easy reach of the user and by moving levers 36 in a direction parallel to the axis of 22, rod 22 is reciprocated thus controlling the angle between mirrors 16 or 17 and the axis of 22. It is then possible, as is best illustrated possibly in Figure 8, to move lever 36 vertically and thus, by virtue of the fork member 32, partially revolve tube 20 which in turn carries with it the mirror. In this way a partial universal movement is provided for mirror 16 so that it can cover the full range of reflecting possibilities. By that is meant the full range through which light reflected from the rear by mirror 16 will be caught on the reflecting mirrors 42 and 44.

Mirrors 42 and 44 are set at 45 degrees to the axis of tube 10 so that any light reflected by mirror 16 will in turn be reflected by mirrors 42 and 44 directly to the operator's view position. For this purpose I have provided an opening at 46 through tube 10. This opening may be provided with clear glass as 48 or most preferably a ground glass so that light coming in through this system will provide an image upon the ground glass. This has the added advantage over the clear glass that the image so placed can be viewed from considerable angle and thus make it possible for a person driving at night to see clearly what is behind him without placing his eyes in the direct beam of reflected light from a rearwardly approaching car. As illustrated, mirrors 42 and 44 are arranged so that they join in a common line 50. With this arrangement, and by proper adjustment of mirrors 16 and 17, the field of the two objective mirrors can so overlap that a full image is presented to the glass 48. The exact manner of mounting these mirrors is a matter of choice. However, they must be so arranged as to provide room, preferably, above them for levers 36.

In order to prevent unwanted longitudinal movement of tube 20 I have provided the set collar 49 which abuts one of the tube bearings as 50.

In the form shown in Figure 9 I have made certain modifications that adapt my device for observation to the rear or to the front or, in fact, to the various intermediate positions also between the front and rear. This is accomplished by certain modifications in the construction that is somewhat complicated over the simpler form shown in Figures 1, 2, and 5. In this present form I have the same arrangement at the center of my device employing the same window 48 and the two angularly disposed mirrors 42 and 44. Instead, however, of having a single housing tube 10 I provide that two end members 52 and 53 be provided, into which are hingedly supported at 24 mirrors 16 and 17. These mirrors may be of any desired type having either plain or magnifying lenses as conditions require. Members 52 and 53 are mounted for rotation upon journals formed at 55 and 56 and further supported in journals at 58 and 59. The two end members are tied together by a bar 60. In some cases it may be more desirable to use a single tube, and cut away the center portion so that it will not interfere with window 48 leaving a bar of sufficient width as 60 so as to carry the rotative force applied to member 52 by worm 62 acting upon worm gear 63, to the other end member 53 so that the two will revolve together. For certain installations it might even be desirable to entirely separate members 52 and 53 and have an additional worm and worm gear applied to tube member 53 so that it would be capable of independent operation. It will be apparent it is believed that with a worm and gear arrangement as shown in Figures 9 and 12, it is possible to rotate my entire device through about three-quarters of the revolution thus making it possible to direct my device down toward the ground in the rear of a car or, by the extreme opposite adjustment, direct it to the ground in front of the car.

Adjustment of mirrors 16 and 17 is accomplished by providing an outstanding bifurcated arm 65 which is secured to each of the mirrors. The slot at the end of this arm is adapted to receive a pin as 66 which is secured to and operated by the longitudinal movement of bar 68.

Inasmuch as it is very desirable to keep the inside of my device clear for the passage of light rays, I find the most convenient means for operating bars 68 is to form them as part of, or secured to, an internal tube 70 or 71. These tubes are disposed to revolve with tubes 52 and 53 and their longitudinal movement to effect adjustment of mirrors 16 and 17 is effected by cutting what, in effect, are annularly disposed gear teeth around the periphery of tubes 70 and 71 so that no matter how they may be revolved in order to properly direct the mirrors, pinions 73 will engage the gear teeth as 74 and 75, respectively, so as to slide the entire inner tube longitudinally of tubes 52 and 53 and thus effect the adjustment of the mirrors. Suitable manual control knobs as 77 and 78 are provided respectively for the control of the worm gear 62 and the reciprocating pinion 73.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. A rear view device comprising a support and a fixed mirror, a spaced reflecting mirror, a tubular rock-shaft mounted in the support and hinged to the reflecting mirror, a crank arm rigid with the rock-shaft, a connecting rod longitudinally movable in the rock shaft, a link pivotally connecting said rod with the reflecting mirror, a lever pivotally mounted on the crank arm and adapted to rock said arm, and said lever having an arm pivotally connected with the connecting rod.

2. The combination with a tubular housing having two spaced windows, a mirror fixed in the housing behind one window, a reflecting mirror mounted in the housing behind the other window, a tubular rock-shaft mounted in the housing and hinged to the reflecting mirror, a crank arm on said shaft, a connecting rod longitudinally reciprocable in the rock shaft and a link pivotally connecting said rod with the reflecting mirror, an adjusting lever pivoted on said crank arm and adapted to rock said arm, said lever having a forked-arm, and a pin on the connecting rod for co-action with said forked arm.

JOSEPH T. L. ALLEN.